(12) United States Patent
Bailey et al.

(10) Patent No.: US 8,378,786 B2
(45) Date of Patent: Feb. 19, 2013

(54) SECURITY PROVISION IN STANDARDS-COMPLIANT RFID SYSTEMS

(75) Inventors: Daniel Vernon Bailey, Pepperell, MA (US); Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 1781 days.

(21) Appl. No.: 11/671,275

(22) Filed: Feb. 5, 2007

(65) Prior Publication Data

US 2007/0194889 A1 Aug. 23, 2007

Related U.S. Application Data

(60) Provisional application No. 60/764,827, filed on Feb. 3, 2006.

(51) Int. Cl.
- *H04Q 5/22* (2006.01)
- *G05B 19/00* (2006.01)
- *H04K 1/00* (2006.01)
- *H04L 9/00* (2006.01)

(52) U.S. Cl. ............ 340/10.1; 340/5.8; 340/10.41; 380/258; 380/260

(58) Field of Classification Search .......... 380/168; 340/442, 10.41
See application file for complete search history.

(56) References Cited

U.S. PATENT DOCUMENTS

| | | | | |
|---|---|---|---|---|
| 5,467,081 A * | 11/1995 | Drews et al. | ......... | 340/5.22 |
| 5,526,484 A * | 6/1996 | Casper et al. | ......... | 709/237 |
| 6,061,344 A | 5/2000 | Wood, Jr. | | |
| 6,724,895 B1 * | 4/2004 | Turner et al. | ......... | 713/168 |
| 6,842,106 B2 * | 1/2005 | Hughes et al. | ......... | 340/5.8 |
| 6,898,711 B1 * | 5/2005 | Bauman et al. | ......... | 713/185 |
| 6,952,781 B1 * | 10/2005 | Chang et al. | ......... | 726/4 |
| 7,049,961 B2 * | 5/2006 | Maloney | ......... | 340/568.1 |
| 7,058,180 B2 * | 6/2006 | Ferchichi et al. | ......... | 380/247 |
| 7,596,697 B2 * | 9/2009 | Sandhu et al. | ......... | 713/171 |
| 2003/0080861 A1 * | 5/2003 | Okubo | ......... | 340/442 |
| 2004/0066278 A1 | 4/2004 | Hughes et al. | | |
| 2004/0100359 A1 | 5/2004 | Reade et al. | | |

(Continued)

FOREIGN PATENT DOCUMENTS

| | | |
|---|---|---|
| WO | WO03/050757 | 6/2003 |
| WO | WO2006/015145 | 2/2006 |

OTHER PUBLICATIONS

EPC Radio Frequency Identity Protocols Class-1 Generation-2 UHF RFID Protocol for Communications at 860 MHz-960 MHz Version 1.0.8 Copyright 2004; pp. 36 and 64.*

(Continued)

*Primary Examiner* — Jennifer Mehmood
*Assistant Examiner* — Pameshanand Mahase
(74) *Attorney, Agent, or Firm* — Ryan, Mason & Lewis, LLP (57) ABSTRACT

Enhanced security is provided in an RFID system comprising a plurality of RFID devices and at least one reader which communicates with one or more of the devices. In one aspect of the invention, a first command is transmitted from the reader to write a first data unit to a memory of given one of the RFID devices. A reply is received in the reader from the given RFID device indicating that a second data unit determined based on contents of the first data unit is available in the memory to be accessed by the reader. A second command is transmitted from the reader to the given RFID device to allow the reader to read the memory to thereby obtain the second data unit. The first and second data units comprise information exchanged as part of a cryptographic protocol carried out between the reader and the given RFID device. In an illustrative embodiment, the cryptographic protocol may comprise a challenge-response authentication protocol.

31 Claims, 2 Drawing Sheets

U.S. PATENT DOCUMENTS

| | | | |
|---|---|---|---|
| 2004/0100363 A1 | 5/2004 | Lane et al. | |
| 2004/0160324 A1 | 8/2004 | Stilp | |
| 2004/0222878 A1 | 11/2004 | Juels | |
| 2004/0223481 A1 | 11/2004 | Juels et al. | |
| 2005/0099268 A1 | 5/2005 | Juels et al. | |
| 2006/0022799 A1 | 2/2006 | Juels | |
| 2006/0033608 A1 | 2/2006 | Juels et al. | |
| 2006/0071778 A1* | 4/2006 | Vesikivi et al. | 340/539.1 |
| 2006/0214766 A1* | 9/2006 | Ghabra et al. | 340/5.25 |

OTHER PUBLICATIONS

A. Juels, "Yoking-Proofs' for RFID Tags," PerCom Workshops, IEEE Computer Society, 2004, pp. 138-143.
A. Juels et al., "Authenticating Pervasive Devices with Human Protocols," Advances in Cryptology-CRYPTO 2005, Lecture Notes in Computer Science, 2005, 26 pages, vol. 3621, Springer-Verlag.
I. Vajda et al., "Lightweight Authentication Protocols for Low-Cost RFID Tags," Workshop on Security in Ubiquitous Computing-Ubicomp, 2003, pp. 1-10.
M. Feldhofer et al., "Strong Authentication for RFID Systems Using the AES Algorithm," M. Joye and J-J. Quisquater, editors, Workshop on Cryptographic Hardware and Embedded Systems—CHES 2004, Lecture Notes in Computer Science, 2004, pp. 357-370, vol. 3156, Springer-Verlag.
T. Staake et al., "Extending the EPC Network—The Potential of RFID in Anti-Counterfeiting," ACM Symposium on Applied Computing, 2005, pp. 1607-1612, ACM Press.
S.A. Weis et al., "Security and Privacy Aspects of Low-Cost Radio Frequency Identification Systems," Proceedings of the First International Conference on Security in Pervasive Computing, 2003, 12 pages.
"EPC™ Radio-Frequency Identity Protocols Class-1 Generation-2 UHF RFID Protocol for Communications at 860 MHz-960 MHz," Version 1.0.8., 2005, pp. 1-93.
J. Stern et al., "Cryptanalysis of the OTM Signature Scheme from FC'02," Financial Cryptography '03, Lecture Notes in Computer Science, 2003, pp. 138-148, vol. 2742, Springer-Verlag.
M. Jakobsson et al., "Security Weaknesses in Bluetooth," 2001, 16 pages.
"Read/Write Transponder," Atmel, Apr. 2003, 22 pages.
S.A. Weis, "Security and Privacy in Radio-Frequency Identification Devices," Master of Science Thesis, MIT, May 2003, pp. 1-79.
A. Juels et al., "Squealing Euros: Privacy Protection in RFID-Enabled Banknotes," Financial Cryptography, 2003, 18 pages, Springer-Verlag.
D.L. Brock, "The Electronic Product Code (EPC): A Naming Scheme for Physical Objects," MIT-AUTOID-WH-002, MIT Auto-ID Center, http://www.autoidcenter.org., Jan. 2001, pp. 1-21, White Paper.
Auto-ID Center, Technical Report, "13.56 MHz ISM Band Class 1 Radio Frequency Identification Tag Interface Specification: Recommended Standard, Version 1.0.0," MIT-AUTOID-TR-011, MIT Auto-ID Center, http://autoidcenter.org, Feb. 2003, pp. 1-31.
S.E. Sarma et al., "RFID Systems, Security & Privacy Implications," MIT-AUTOID-WH-014, MIT Auto-ID Center, Nov. 2002, pp. 1-16, White Paper.
D.W. Engels, "HF Identity Tag Action Group: Scope and Deliverables," Technical Report, MIT-AUTOID-TR-020, MIT Auto-ID Center, Jul. 2003, pp. 1-5.
S.E. Sarma, "Towards the 5¢ Tag," Technical Report, MIT-AUTOID-WH-006, MIT Auto ID Center, Nov. 2001, pp. 1-19, White Paper.
M. Mealling, "Auto-ID Object Name Service (ONS) 1.0," Auto-ID Center Working Draft, Aug. 2003, 17 pages.
M.G. Reed et al., "Protocols Using Anonymous Connections: Mobile Applications," Security Protocols, Proceedings of the 5th International Workshop, Lecture Notes in Computer Science, 1997, 11 pages, vol. 1361, Springer-Verlag.
S. Clark et al., "Auto-ID Savant Specification 1.0," Auto-ID Center, Sep. 2003, pp. 1-59.
Auto-ID Center, Technical Report, "860 MHz-960MHz Class 1 Radio Frequency Identification Tag Radio Frequency & Logical Communication Interface Specification Recommended Standard, Version 1.0.0," MIT-AUTOID-TR-007, MIT Auto-ID Center, Nov. 2002, pp. 1-17.
K.P. Fishkin et al., "Some Methods for Privacy in RFID Communication," 1st European Workshop on Security in Ad-Hoc and Sensor Networks, ESAS, 2004, pp. 1-13.
United States Food and Drug Administration, "Combating Counterfeit Drugs: A Report of the Food and Drug Administration," Feb. 18, 2004, pp. 1-45.

* cited by examiner

SECURITY PROVISION IN STANDARDS-COMPLIANT RFID SYSTEMS

RELATED APPLICATION(S)

The present application claims the priority of U.S. Provisional Patent Application Ser. No. 60/764,827, filed Feb. 3, 2006 and entitled "Shoehorning Security into the EPC Standard," the disclosure of which is incorporated by reference herein.

The present application is also related to U.S. patent application Ser. No. 10/673,540, filed Sep. 29, 2003 and entitled "Method and Apparatus for Selective Blocking of Radio Frequency Identification Devices," U.S. patent application Ser. No. 10/782,309, filed Feb. 19, 2004 and entitled "Low-Complexity Cryptographic Techniques for use with Radio Frequency Identification Devices," U.S. patent application Ser. No. 10/915,189, filed Aug. 10, 2004 and entitled "Radio Frequency Identification System with Privacy Policy Implementation based on Device Classification," U.S. patent application Ser. No. 11/191,633, filed Jul. 28, 2005 and entitled "Methods and Apparatus for RFID Device Authentication," and U.S. patent application Ser. No. 11/193,729, filed Jul. 29, 2005 and entitled "Proxy Device for Enhanced Privacy in an RFID System," which are commonly assigned herewith and incorporated by reference herein.

FIELD OF THE INVENTION

The present invention relates generally to radio frequency identification (RFID) tags or other types of RFID devices, and more particularly to techniques for authenticating such devices or otherwise providing security in RFID systems.

BACKGROUND OF THE INVENTION

A conventional RFID tag typically comprises an integrated circuit transceiver capable of transmitting a unique serial number or other identifying information to a nearby reader in response to a query from the reader. Many RFID tags are "passive" in that they do not include a battery or other power source, but instead obtain the power necessary to operate from the query signal itself.

Ongoing RFID tag development efforts have led to significant cost and size reductions, which should result in a rapid proliferation of RFID tags into many new areas of use. For example, RFID tags are expected to replace printed barcodes in consumer product applications. The Electronic Product Code (EPC) tag is a form of RFID device that is emerging as a successor to the printed barcode. EPC tags are an evolving standard under development by an organization called EPCglobal, a joint venture between the UCC and EAN, the organizations that oversee barcode standards in the U.S. and Europe, respectively. An EPC is the form of identifier that an individual EPC tag emits as prescribed by the EPCglobal standard. An EPC includes not just the information contained in a conventional printed barcode, namely the manufacturer and type of a particular product, but also a unique serial number. Additional details can be found in the current version of the EPCglobal standard document, "EPC™ Radio-Frequency Identity Protocols Class-1 Generation-2 UHF RFID Protocol for Communications at 860 MHz-960 MHz," Version 1.0.9, 2006, and in the corresponding conformance specification, "Class-1 Generation-2 UHF RFID Conformance Requirements," Version 1.0.2, 2006, both of which are incorporated by reference herein.

The unique serial number of an EPC tag associated with an object can serve as a pointer to a database entry containing a detailed history of the object. Thanks to the features of automated scanning and unique identification, RFID systems promise fine-grained tracking of inventory on an unprecedented scale.

Certain commercial segments, like the pharmaceutical industry, are coming to view EPC tags as an anti-counterfeiting tool. EPC tags are a potent mechanism for object identification, and can facilitate the compilation of detailed object histories and pedigrees. They are poor authenticators, though, as they possess no explicit authentication functionality. The EPCglobal standards prescribe no mechanism for EPC readers to authenticate the validity of the tags they scan. An EPC tag emits its EPC promiscuously, i.e., to any querying reader. Readers accept the validity of the EPCs they scan at face value. Thus, EPC tags are vulnerable to counterfeiting or other types of cloning attacks.

An attacker can learn an EPC tag's essential data, its EPC, simply by scanning it or by gaining access to an appropriate tag database. The term "skimming" is used herein to denote the process of scanning an EPC tag to obtain its EPC for the purpose of cloning the tag. Furthermore, if the unique identifiers in a manufacturer's EPCs are not random, e.g., if they are sequential, then an attacker that sees an EPC on one item can guess or fabricate another valid EPC. In brief "identity theft" of EPC tags is a straightforward matter because EPCs are data objects that are easily separable from EPC tags.

Although EPC tags carry no explicit mechanisms for authentication, they do possess some data-security features. The description herein will make reference to basic and enhanced EPC tags. A basic EPC tag is one that carries only the mandatory features of the EPCglobal standard, while an enhanced EPC tag additionally includes an access-control function that is optional in the EPCglobal standard. Basic EPC tags have only one significant security feature, namely a privacy-enhancing kill command. When an EPC tag receives this command, it "self-destructs," which is to say that it renders itself completely and permanently inoperable. To protect against accidental or malicious killing of tags, the kill command only takes effect when accompanied by a valid password, referred to as a personal identification number (PIN). In the EPCglobal standard, the kill PIN is 32 bits in length.

With regard to enhanced EPC tags, such tags respond to a command called access, whose implementation is optional in the EPCglobal standard. When accompanied by a valid 32-bit access PIN, the access command causes a tag to transition into what is called a "secured" state. Tags may be configured such that certain commands only function when a tag is "secured." In particular, read access to the memory banks for the access and kill PINs may be made dependent on an EPC tag being "secured." The standard supports no PINs other than the access and kill PINs.

In consequence, although the EPC of a tag may be readily skimmed, a properly configured EPC tag does not promiscuously emit its PINs. Thus the PINs are resistant to skimming.

Some commercially available RFID tags can perform cryptographic challenge-response protocols. Such tags offer resistance to cloning attacks involving skimming. They typically cost significantly more than EPC tags, though, and may therefore be practical only for certain niche applications such as defense logistics.

The above-cited U.S. patent application Ser. No. 10/782, 309 discloses an authentication approach referred to as "minimalist" cryptography, including a security model for RFID environments that permits a form of dynamic challenge-response protocol without the use of complex cryptographic operations. However, even this minimalist approach may require greater tag resources than are available in the current generation of EPC tags.

A number of new, lightweight cryptographic primitives have been proposed for RFID authentication. See, for example, A. Juels, "'Yoking-proofs' for RFID tags," PerCom Workshops 2004, pp. 138-143, IEEE Computer Society, 2004; A. Juels and S. Weis, "Authenticating Pervasive Devices with Human Protocols," In Advances in Cryptology-CRYPTO 2005, pp. 293-308, Springer-Verlag, 2005, Lecture Notes in Computer Science, Volume 3621; and I. Vajda and L. Buttyan, "Lightweight Authentication Protocols for Low-Cost RFID Tags," In Workshop on Security in Ubiquitous Computing-Ubicomp 2003, 2003.

Other recent work has led to more compact implementations of symmetric-key primitives like advanced encryption standard (AES) for RFID tags. See, for example, M. Feldhofer et al., "Strong Authentication for RFID Systems Using the AES Algorithm," In M. Joye and J.-J. Quisquater, editors, Workshop on Cryptographic Hardware and Embedded Systems—CHES '04, Volume 3156 of Lecture Notes in Computer Science, pp. 357-370, Springer-Verlag, 2004. However, these implementations are still well beyond the reach of Class-1 Gen-2 EPC tags today, and unsupported in the EPC-global standard.

The Auto-ID Lab, the research arm of EPCglobal, operates a special interest group devoted to use of RFID to combat counterfeiting. Researchers there have proposed uses of EPC to combat counterfeiting of consumer items. See T. Staake et al., "Extending the EPC Network—the Potential of RFID in Anti-Counterfeiting," In ACM Symposium on Applied Computing, pp. 1607-1612, ACM Press, 2005. They suggest that track-and-trace technologies, i.e., supply-chain monitoring based on current EPC tags, can yield good improvements over existing security. They also discuss the benefits of challenge-response protocols for tag authentication, and review extensions to existing EPC architecture for this purpose. They do not investigate incorporation of cryptography into Class-1 Gen-2 EPC tags. Instead, they propose support in future, higher-class EPC standards.

The above-cited U.S. patent application Ser. No. 11/191, 633 discloses techniques for authenticating EPC tags and other types of RFID devices, so as to prevent counterfeiting or other cloning attacks without requiring cryptographic operations. In one aspect, an identifier transmitted by a given one of the REID devices is received by a reader, or by a separate verifier via the reader. At least first and second codes are determined by the reader or verifier, with the first code being a valid code for the identifier, and the second code being an invalid code for the identifier. These codes are communicated to the given RFID device by the reader, or by the verifier via the reader, Return communications are processed by the reader or verifier to determine if the RFID device is able to confirm that the first code is a valid code and the second code is an invalid code. If the RFID device can so confirm, it has been authenticated. In an illustrative embodiment, the given RFID device is an EPC tag, with the first code being a valid kill code of the EPC tag, and the second code being a spurious or invalid kill code of the EPC tag. Such an embodiment leverages the PIN controls of Class-1 Gen-2 EPC tags to achieve authentication in a manner compliant with the standard.

Despite the considerable advances disclosed in U.S. patent application Ser. No. 11/191,633 and the other patent applications cited above, a need remains for further improvements in providing authentication and other security features in standards-compliant RFID systems, such as systems which include Class-1 Gen-2 EPC tags. For example, it would be desirable if improved authentication protocols with enhanced resistance to eavesdropping and other attacks could be provided in a manner suitable for use with Class-1 Gen-2 EPC tags or other simple RFID devices.

SUMMARY OF THE INVENTION

The present invention in accordance with one aspect thereof provides techniques for authenticating EPC tags or other RFID devices in an RFID system. The RFID system generally includes a plurality of RFID devices and at least one reader which communicates with one or more of the devices.

In an aspect of the invention, a first command is transmitted from the reader to write a first data unit to a memory of given one of the RFID devices. A reply is received in the reader from the given RFID device indicating that a second data unit determined based on contents of the first data unit is available in the memory to be accessed by the reader. A second command is transmitted from the reader to the given RFID device to allow the reader to read the memory to thereby obtain the second data unit. The first and second data units comprise information exchanged as part of a cryptographic protocol carried out between the reader and the given RFID device.

In an illustrative embodiment, the given RFID device comprises an EPC tag, and more specifically a Class-1 Gen-2 EPC tag. The first and second commands may be, for example, existing BlockWrite and Read commands, respectively, of the EPCglobal Class-1 Gen-2 standard. Alternatively, the first and second commands may be new or custom commands defined in a manner compliant with the EPCglobal Class-1 Gen-2 standard, but not part of that standard. Of course, the invention can be implemented using other types of EPC tags or RFID devices, and other types of commands.

The cryptographic protocol carried out between the reader and the given RFID device may comprise a challenge-response authentication protocol. In such an arrangement, the first and second data units may comprise respective challenge and response values of the challenge-response authentication protocol. The response value of the challenge-response protocol may be a one-time password determined by the given RFID device based on a current value of a real-time clock, a counter or other similar element internal to the device. In alternative implementations, the challenge value may be implied, rather than transmitted directly by the reader. Such an implied challenge value may be determined by the given RFID device and utilized to generate a corresponding response value.

The first and second data units in the above-noted illustrative embodiment may comprise application protocol data units configured in accordance with the ISO 7816-4 protocol. At least one of the application protocol data units configured in accordance with the ISO 7816-4 protocol may comprise a command transmitted in a compressed format which includes a header indicating presence or absence of one or more of a command class byte, a command instruction byte and a command parameters byte. Such command compression reduces the overhead associated with the cryptographic protocol.

Advantageously, the present invention in the illustrative embodiments provides simple and efficient techniques for providing enhanced security in EPC tags or other RFID devices, in a manner that utilizes standards-compliant RFID device read and write functionality to facilitate implementation of cryptographic operations.

These and other features and advantages of the present invention will become more readily apparent from the accompanying drawings and the following detailed description.

DETAILED DESCRIPTION

The present invention will be described herein with reference to an exemplary RFID system in which multiple RFID devices communicate with an RFID device reader. It is to be appreciated, however, that the invention is not restricted to use in this or any other particular RFID system configuration.

The term "RFID device" as used herein is intended to include an RFID tag or any other type of device configurable for transmission of device-identifying information via radio frequency communications. Although the following description will refer primarily to EPC tags, it is to be understood that the techniques disclosed are applicable to other types of RFID tags, and more generally applicable to other types of RFID devices. Also, the terms "radio frequency" or "RF" as used herein are not intended to be restricted to any particular frequency range, but are instead intended to be construed more generally so as to encompass any contiguous or non-contiguous arrangement of one or more signal frequencies suitable for supporting wireless communication between at least one device and at least one reader.

As described in the above-cited U.S. patent application Ser. No. 10/915,189, a given RFID device in an illustrative embodiment of the invention may have one or more of a number of different classifications. For example, the given RFID device may be classified as one of public, private, blocker, unblocker, etc. The classification of the given RFID device may be dynamic, that is, it can vary over time. Also, it is possible for a given RFID device to have multiple classifications at the same time, depending upon the particular set of classifications in use. The present invention, however, does not require the use of these or any other RFID device classification techniques.

The device-identifying information associated with a given RFID device may be an EPC, a serial number or any other type of identifier. It should be noted that not every identifier in a given set of unique identifiers need have a corresponding realized device.

The term "identifier" as used herein is intended to include a pseudonym of the type described in the above-cited U.S. patent application Ser. No. 10/782,309. In addition, an identifier is intended to include any information suitable for providing an indication of a classification of a particular RFID device.

The term "reader" as used herein is intended to include any type of device capable of interacting with an RFID tag or other device so as to receive device-identifying information therefrom.

Figure 1:
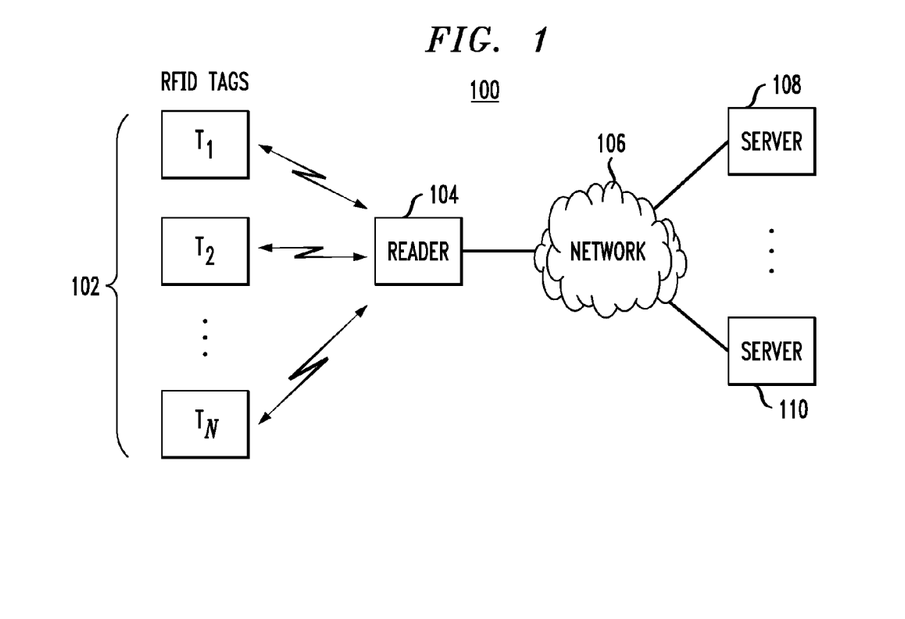
FIG. 1 is a simplified block diagram of an exemplary RFID system in which the present invention is implemented in one embodiment.

FIG. 1 shows an RFID system 100 in which the present invention is implemented. The system 100 includes a number N of RFID tags 102, more particularly denoted by their associated tag identifiers $T_1, T_2, \ldots T_N$, and an RFID reader 104. The reader 104 communicates with the tags 102 and receives identifying information therefrom, in the form of one or more transmitted identifiers. The reader 104 is coupled via a network 106 to servers denoted 108, 110. Although not explicitly shown in FIG. 1, a verifier may be associated with the reader 104. Such a verifier may be implemented, for example, using one or both of the servers 108, 110, another network element accessible via the network 106, or another system element coupled to or otherwise associated with the reader 104.

A given RFID tag 102 in accordance with the invention generally includes circuitry comprising memory, processing logic and an RF transceiver. These elements may be configured in a manner similar to that used in conventional RFID tags.

One or more of the tags 102 may each comprise a so-called "blocker tag" configured with an ability to block the operation of a singulation algorithm utilized by the reader 104 in order to provide enhanced privacy for a user of the tag, as described in the above-cited U.S. patent application Ser. No. 10/673,540. The present invention, however, does not require the use of such blocker tags.

One or more of the tags 102 may also or alternatively implement minimalist cryptography, soft blocking, or other techniques described in the above-cited U.S. patent application Ser. Nos. 10/782,309 and 10/915,189. Again, the present invention does not require the use of such techniques.

The network 106 may represent a global computer network such as the Internet, a wide area network (WAN), a local area network (LAN), a satellite network, a telephone or cable network, or various portions or combinations of these and other types of networks. The servers 108, 110 may be conventional processor-based information processing devices of a type conventionally utilized in conjunction with RFID readers in an RFID system.

The particular number N of tags 102 in the system 100 is purely arbitrary, and the system can be configured to support any desired number of tags. Also, although only a single reader 104 is shown in the figure for simplicity and clarity of illustration, the system will typically include multiple readers. Furthermore, it should be noted that a given reader need not be connected to a network, and may instead operate as a stand-alone device, or may be only intermittently connected to the network. Also, a given reader can be directly connected to a server or other system element, rather than connected thereto over a network as illustrated in the example system 100.

Figure 2:
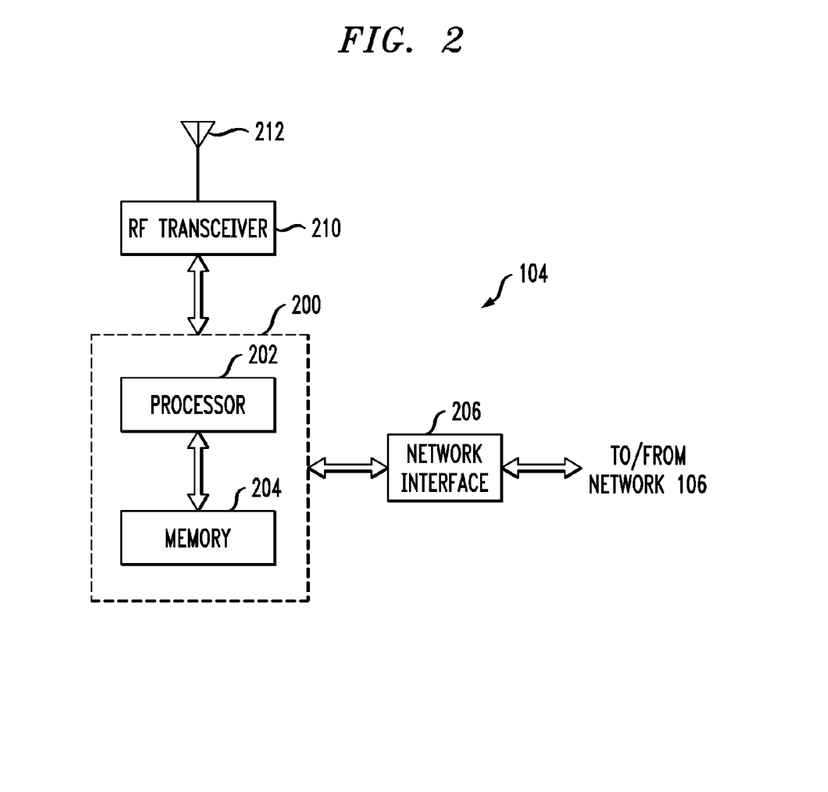
FIG. 2 illustrates one possible implementation of an RFID device reader of the FIG. 1 system.

FIG. 2 shows one possible implementation of the reader 104 of the FIG. 1 system. The reader in this implementation includes a processing block 200, comprising a processor 202 coupled to a memory 204, a network interface 206, an RF transceiver 210, and an antenna 212. One or more of these elements may be implemented in whole or in part as a conventional microprocessor, digital signal processor, application-specific integrated circuit (ASIC) or other type of circuitry, as well as portions or combinations of such circuitry elements. Software programs for controlling the operation of the reader 104 may be stored in the memory 204 and executed by the processor 202. The memory 204, and other memories referred to herein, may comprise, for example, random access memory (RAM), read-only memory (ROM), electrically erasable programmable ROM (EEPROM), or other types of storage elements, in any combination.

A typical RFID reader is generally only able to communicate with a single RFID tag at a time. In effect, however, the reader may be viewed as broadcasting a query to all of the tags 102 at once. If more than one tag responds to a query by the reader, the reader detects a collision and executes a singulation algorithm which allows the reader to communicate with the conflicting tags one at a time.

Conventional RFID tag systems may operate at a frequency of, for example, either 13.56 MHz or 915 MHz, and may utilize, for example, ALOHA-type singulation algorithms or tree-walking singulation algorithms. Other frequencies, such as 125 kHz and 2.45 GHz, are also used, and employ similar singulation algorithms. Such singulation algorithms are known in the art, and will therefore not be further described herein. The invention can be utilized with a reader incorporating one of these known singulation algorithms, or a reader incorporating another type of singulation algorithm, or any other type of reader, including a reader that does not singulate tags. Thus, it is to be appreciated that the invention does not require the use of singulation.

Figure 3:
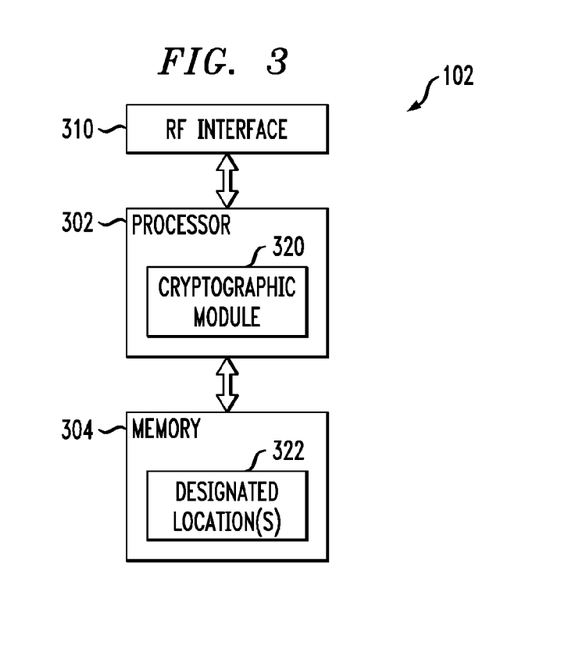
FIG. 3 illustrates one possible implementation of a given RFID device of the FIG. 1 system.

FIG. 3 shows one possible implementation of a given one of the RFID tags 102 of the FIG. 1 system. The tag comprises a processor 302 coupled to a memory 304, and an RF interface which may comprise, for example, an RF transceiver and an associated antenna. The processor may be in the form of relatively simple processing logic, or may represent a more complex processor. In the implementation shown, the processor 302 implements a cryptographic module 320, which may comprise, for example, a one-time password generator or other processing element providing cryptographic functionality as described herein. The cryptographic module may comprise one or more software programs that are stored in memory 304 and executed by processor 302. The memory 304 comprises one or more designated locations 322, which may be accessible to both the tag 102 and to the reader 104. The reader may be required to submit a PIN in order to access the designated locations 322, in accordance with the EPC Class-1 Gen-2 standard. The designated locations 322 may comprise substantially the entire memory of the tag 102, or just a designated subset of the tag memory. For example, the memory 304 may be organized in the form of multiple banks, with one or more of the banks being designated as accessible to the reader 104.

The present invention in the illustrative embodiments provides techniques for RFID device authentication or other types of enhanced security. Advantageously, these techniques can be implemented in a system which comprises EPCglobal Class-1 Gen-2 UHF tags or other types of EPC tags. Of course, the techniques described herein can be readily applied to other types of EPC tags, including EPC tags of different classes and generations, or more generally other types of RFID devices.

An RFID device authentication technique of the present invention may be implemented, by way of example, in a system in which RFID tags or RFID readers are implemented in cell phones or other mobile telephones, portable computers, or other similar devices. More generally, such RFID device or RFID reader elements may be implemented in or otherwise comprise at least a portion of a mobile telephone, a portable computer, a personal digital assistant (PDA), a hardware-based authentication token such as an RSA SecurID® token commercially available from RSA, The Security Division of EMC Corporation, of Bedford, Mass., U.S.A., or any other type of processing device utilizable in implementing RFID device authentication functionality as described herein. The invention thus does not require any particular RFID device or reader configuration.

In the illustrative embodiments, RFID device authentication is implemented in the FIG. 1 system using an exemplary protocol which will be described below in conjunction with the flow diagram of FIG. 4.

It will initially be assumed without limitation that the tags 102 of the FIG. 1 system comprise EPCglobal Class-1 Gen-2 UHF tags. As indicated above, however, the described techniques can be adapted in a straightforward manner for use with a wide variety of other types of RFID tags, or more generally, RFID devices.

As indicated previously herein, conventional EPC tags provide only very limited security features, namely, PIN-based kill and access control. The drafters of the EPC standard rejected more sophisticated arrangements, like cryptographic functionality, in favor of low cost. Rather than incorporate security technologies into Class-1 tags, EPCglobal instead specified a hierarchy of tags, each successive level adding functionality while incorporating all the features of lower-class tags. In this way, higher-class tags could build on the existing infrastructure without the need to develop a new air interface for each.

The illustrative embodiments provide RFID tags that implement cryptographic functionality while remaining compliant with the Class-1 Gen-2 standard. These techniques could serve, for example, as an alternative to the creation of a Class-2 EPC standard or as the basis for such a standard.

As will be described, the illustrative embodiments implement cryptographic functionality in RFID system 100 by utilizing read and write commands involving the one or more designated locations 322 of memory 304 in the RFID tag 102 to convey cryptographic values between the cryptographic module 320 and the reader 104. Although the illustrative embodiments are described in the context of tag authentication, the disclosed techniques may be adapted in a straightforward manner to provide other types of security in the system 1003 such as a privacy-enhancing protocol based on pseudonym rotation of the type described in the above-cited U.S. patent application Ser. No. 10/782,309.

An example of a simple challenge-response authentication protocol that may be implemented in the system 100 to allow reader 104 to authenticate a given RFID tag 102 is as follows:

1. Reader→Tag: $C_R$
2. Tag→Reader: $ID_T$, $R_T$ where $C_R$ denotes the challenge from the reader, $R_T$ denotes the response from the tag, and $ID_T$ denotes the EPC carried by the tag. A challenge-response protocol of this type prevents an eavesdropping attacker from obtaining a static password and simply reusing it.

The tag response $R_T$ may be, for example, a 32-bit or 64-bit response computed as a function $H(K_{TS}, C_R)$ where $H()$ is a cryptographic function like a block cipher, $K_{TS}$ is a secret key known to the tag and the reader. Of course, $R_T$ could be chosen to have a length longer than 64 bits if conditions warrant. In an application where an attacker could feasibly try a large number of interactive queries with the reader, a longer $R_T$ value would be a good choice, but 64 bits is appropriate for many applications given the relatively short range of Class-1 Gen-2 tags. To address off-line attacks, one can choose $K_{TS}$ to be much longer, such as 128 bits, without increasing the number of bits sent over the air. Various block ciphers or other cryptographic functions may serve as the function $H()$, such as the AES cipher described in the above-cited M. Feldhofer et al. reference.

The value $C_R$ may be chosen by the reader and explicitly sent to the tag. Another possible approach is to utilize a time-synchronous one-time password. In such an approach, the tag has a real-time clock, and it uses the time of day as an implicit challenge. This approach eliminates the need for a special message from the reader carrying $C_R$. To ensure that a particular one-time password is not being replayed, one can choose a time interval for $C_R$ short enough to preclude replay attacks and the reader can store the last correct password value received from the tag.

The two-message protocol above can therefore be collapsed into a single message, with the response $R_T$ being a one-time password. When asked for its EPC, the tag responds with its EPC concatenated with its one-time password $R_T$.

1. Tag→Reader: $ID_T$, $R_T$

The tag could alternatively send only its one-time password $R_T$. The implicit challenge value $C_R$ could be, for example, a strictly-increasing counter, making $R_T$ an event-synchronous one-time password.

According to the EPCglobal standard, the transmitted EPC data field may be up to 512 bits. Therefore, using 32 or 64 of these bits for a one-time password still leaves a very large number of available identifiers. No modifications to the standard are required, although a general agreement on the placement of the one-time password $R_T$ within a transmitted EPC field may be beneficial. In the above one-message protocol, the tag provides additional evidence of its identity which the reader may check or not. For high throughput applications, the reader can simply ignore the one-time password, only checking the password when it wants to gain assurance that the tag has not been cloned.

If an application requires more robust reader authentication, the reader could additionally be required to respond to a challenge. The Class-1 Gen-2 standard already provides data fields for the reader to transmit 16-bit passwords, and such a field may be used by the reader to transmit a one-time password, with the transmitted value being verified on the tag. In such an arrangement, the tag would generally need either a real-time clock or a way to deliver a challenge to the reader. It may also be desirable to provide a way for the tag and reader to negotiate a common set of features, as in an SSL cipher suite, given that different applications may need different types of security.

The illustrative embodiments may be viewed as utilizing the EPCglobal Class-1 Gen-2 standard as a communication protocol for carrying protocol data units consumed by a protocol entity that is not part of the Class-1 Gen-2 standard. Such protocol data units are referred to herein as application protocol data units (APDUs).

As illustrated in FIG. 3, the tag 102 comprises memory 304 having one or more designated locations 322 that may be read or written by the reader 104. The EPCglobal standard more particularly specifies four distinct banks of tag memory which may be read or written by the reader: reserved, EPC, TID, and User. The User bank offers the most flexibility, allowing user-defined organization of arbitrary amounts of memory arranged in 16-bit words. Subject to certain conditions possibly involving the presentation of a fixed password, the tag is obliged to obey BlockWrite or Read commands from the reader. But the contents of memory need not be fixed: neither the standard nor its associated conformance document prohibit the manipulation of memory by logic in the tag.

Figure 4:
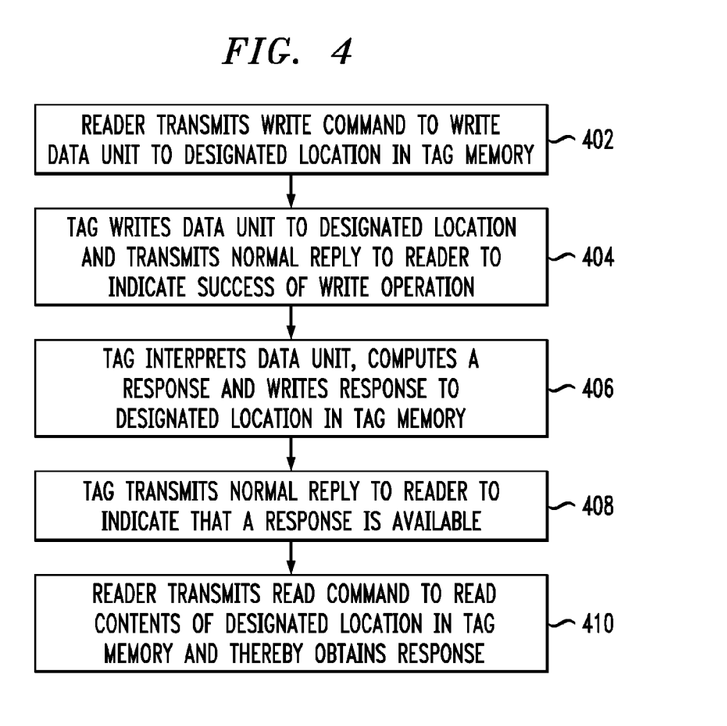
FIG. 4 is a flow diagram showing portions of a cryptographic protocol carried out between the reader and a given RFID device in the FIG. 1 system.

The flow diagram of FIG. 4 illustrates the manner in which cryptographic information can be exchanged between a given one of the tags 102 and the reader 104 in a manner compliant with the EPCglobal Class-1 Gen-2 standard. It is assumed that the given tag 102 has been singulated by the reader so that they can engage in one-to-one communication. This task is accomplished by the tag successfully responding to a sequence of Query, ACK, and Req_RN commands to arrive in the Access state, as described in the standard. At this point the reader and tag participate in a security protocol which is based on the exchange of cryptographic information as shown in FIG. 4.

In step 402, the reader transmits a write command in order to write a particular data unit, more specifically one of the above-noted APDUs, to a designated location in the memory 304 of tag 102. The designated location in this example is a designated block of memory in the User memory bank, starting with word zero. Since the Class-1 Gen-2 standard follows a reader-talks-first paradigm, the exchange begins in step 402 with a BlockWrite command which writes the contents of the APDU to the designated location in memory. The structure of this write command is shown in TABLE 1 below.

TABLE 1

Using BlockWrite command to carry an APDU

|  | Command | MemBank | WordPtr | WordCount | Data | Handle | CRC-16 |
| --- | --- | --- | --- | --- | --- | --- | --- |
| Number of bits | 8 | 2 | EBV | 8 | Variable | 16 | 16 |
| Description | 11000111 | 11 | 0000000 | Number of Words to write | APDU | handle |  |

In step 404, the tag writes the APDU to the appropriate location, and then transmits its normal reply to indicate success of the write operation. Because protocol APDUs in this embodiment are meant for immediate consumption, rather than long-term storage, the portion of memory 304 where the APDUs are stored may comprise, for example, RAM instead of nonvolatile storage such as EEPROM. This allows the tag to use the time and power ordinarily used for writing non-volatile storage for interpretation of, and response to, the APDU.

As usual following command transmission, the reader broadcasts a continuous wave (CW) for up to 20 milliseconds (msec) to power the tag and allow it to complete its operation. Additional logic in the tag processor 302 uses this power and time to interpret the APDU, compute a response if necessary, and write its response to a designated location in the tag memory, as indicated in step 406. The response is in the form of an APDU. The designated location to which the response APDU is written in step 406 may be the same location to which the received APDU is written in step 404, or may be another previously agreed-upon memory location. It should be noted, however, that the term "designated location" as used herein is intended to be construed broadly, and should not be interpreted to require previous agreement on a particular location by both reader and tag. For example, a designated location may be explicitly specified by a command sent by a reader, or may be implicit in the particular type of command that is sent by the reader.

In step 408, the tag sends its usual reply frame, which in this case indicates the tag has interpreted the received APDU and a corresponding response APDU is available for access by the reader. If processing a command takes longer than 20 msec, the response APDU prepared by the tag can indicate that processing has not yet completed.

The reader can now obtain the available response APDU by issuing a Read command, as indicated in step 410. As before, it is assumed that the designated block of tag memory is located in the User memory bank and starts at word zero. This command frame is illustrated in TABLE 2.

TABLE 2

Using Read command to obtain an APDU

|  | Command | MemBank | WordPtr | WordCount | Handle | CRC-16 |
|---|---|---|---|---|---|---|
| Number of bits | 8 | 2 | EBV | 8 | 16 | 16 |
| Description | 11000010 | 11 | 0000000 | Number of Words to read | handle |  |

The above-described message sequence advantageously allows the tag and reader to efficiently implement a wide variety of security protocols, including the challenge-response authentication protocols previously mentioned.

As an alternative to utilizing the EPCglobal BlockWrite and Read commands as in the above example, new commands may be defined to provide the same functionality. For example, WriteGenericAPDU and ReadGenericAPDU commands could be assigned their own command identifiers without changing the basic approach.

It was noted above that the EPCglobal standard follows a reader-talks-first paradigm. In order to handle APDUs originated by the tag, one could have the reader periodically use a read command to check if the contents of the one or more designated locations in tag memory have changed. However, a polling-based approach of this type can be unwieldy.

This issue is addressed in the illustrative embodiment by appropriate selection of a higher-level protocol. We have determined that one such protocol particularly well suited for use in the illustrative embodiments is ISO 7816-4, described in ISO, "Identification Cards-Integrated Circuit Cards-Part 4: Organization, Security and Commands for Interchange," 2006, which is incorporated by reference herein. ISO 7816-4 is in widespread use in the context of smart cards.

The several documents in the ISO 7816 series are each devoted to a particular layer in a stack of protocols. This layered approach allows particular standards in the series to be applied to different environments. For instance, the ISO 14443 series of standards for contactless proximity cards explicitly allows for the use of ISO 7816-4 APDUs to be carried over its logical and physical layers. From the perspective of a lower layer protocol, an ISO 7816-4 APDU would simply be seen as a data payload.

ISO 7816-4 offers a set of APDUs arranged in command-response pairs to authenticate and securely access data stored on a card. The specification declines to specify algorithms, physical interface technology, or the internal implementation within the card. However, most of its features are designed for systems where the reader talks first, which complements the logical layer features in Class-1 Gen-2.

ISO 7816-4 defines general command and response frames, depicted below in TABLE 3 and TABLE 4, respectively. It further specifies instantiations of these to perform tasks like entity authentication of card, reader, or both as well as transfer of encrypted or integrity-protected data. For illustrative purposes, the description will focus on one command called Internal Authenticate, although it is to be appreciated that the described techniques extend to other commands as well. The particular ISO 7816-4 command used in a given interaction between a reader and a tag may be determined from information such as the TID of the tag. For example, knowing the tag TID, the reader can use whichever 7816-4 command and associated parameters for which the tag is optimized. To access other commands, the reader can explicitly specify the desired command and parameters.

TABLE 3

ISO 7816-4 Command

| Field | Description | Number of Bytes |
|---|---|---|
| Command header | Class byte denoted CLA | 1 |
| Command header | Instruction byte denoted INS | 1 |
| Command header | Parameter bytes denoted P1-P2 | 2 |
| Command data-length $L_c$ | Absent if $N_c = 0$, otherwise equal to $N_c$ | 0, 1, or 3 |
| Command data | Absent if $N_c = 0$, otherwise a string of $N_c$ bytes | $N_c$ |
| Maximum response length | Absent if $N_e = 0$, otherwise equal to $N_e$ | 0, 1, or 3 |

TABLE 4

ISO 7816-4 Response

| Field | Description | Number of Bytes |
|---|---|---|
| Response data | Absent if $N_r = 0$, otherwise a string of $N_r$ bytes | $N_r$ |
| Response trailer | Status bytes SW1 and SW2 | 2 |

With this set of headers, data lengths, and trailers, the reader can unambiguously specify precisely which command is desired along with details on algorithms, protocols, parameters, key identifiers, and of course, command data. The tag can reply with status bytes indicating success, reasons for failure, or the fact that processing has not yet completed.

Given the rich feature set of ISO 7816-4, one can address a great number of applications. But we observe that in this environment, tags may specialize on one or two security services such as authentication of a tag to a reader to prevent counterfeiting. In the following description, we focus on heavily optimizing a tag's most-used feature while still allowing the richness of the 7816-4 command set.

It is apparent from TABLES 3 and 4 that there is overhead associated with this command set: a typical command would incur six bytes of overhead, while a response would incur two. Since communication bandwidth is at a premium in this environment, techniques for reducing this overhead will be described below.

A simple tag authentication protocol using challenge-response values $C_R$ and $R_T$ was described previously. The manner in which this particular authentication protocol can be implemented using the techniques of FIG. 4 and the ISO 7816-4 Internal Authenticate command shown in TABLE 5 below will now be described. It is assumed that the challenge value $C_R$ will be provided by the reader in the protocol. Values postfixed by "h" in the tables indicate hexadecimal notation.

TABLE 5

Internal Authenticate Command from Reader

| Field | Description | Number of Bytes |
|---|---|---|
| Command Class Byte | 0h | 1 |
| Command Instruction Byte | 88h | 1 |
| Command Parameters | 0h | 2 |
| Command data-length | 8h | 1 |
| Command data | $C_R$ | 8 |
| Maximum response length | 8h | 1 |

The corresponding response format is shown in TABLE 6 below.

TABLE 6

ISO 7816-4 Response

| Field | Description | Number of Bytes |
|---|---|---|
| Response data | $R_T$ | 8 |
| Status bytes | 6100h | 2 |

The Internal Authenticate command and its corresponding response as shown in TABLES 5 and 6 above may be sent as APDUs using the respective BlockWrite and Read commands of EPCglobal Class-1 Gen-2 as previously described in conjunction with FIG. 4. The total numbers of bytes sent over the air in this case are given in TABLE 7 below. For comparison purposes, the results for the case of an implicit challenge, using the previously-described one-time password approach, are also shown.

TABLE 7

Frame sizes for Uncompressed Internal Authenticate using BlockWrite

| Frame Type | Bytes | Bits |
|---|---|---|
| BlockWrite Carrying Internal Authenticate with Challenge | 22 | 169 |
| BlockWrite Carrying Internal Authenticate with Implicit Challenge | 13 | 97 |
| Read Carrying Response | 18 | 137 |

The command structure in TABLE 5 shows the reader providing an eight-byte challenge value $C_R$ to the tag. Note that the class and command parameter bytes are set to zero. The semantics of the class byte are defined in the above-cited ISO 7816-4 standard. A reader can indicate if this command frame is a fragment of a longer command and if any encryption or integrity protection has been applied. In the present example, neither of these conditions is true and therefore these bytes are set to zero. The command parameter identifies the algorithm, protocol, and modes, but ISO 7816-4 allows these bytes to be set to zero if their values are implicitly known. For reasons of cost and efficiency, many tags may support only one set of these values.

As indicated above, the command overhead can be reduced. This is achieved in the illustrative embodiments by compressing the command structure. Generally, it will be desirable to optimize the command structure for particular security features required in a given application. For example, in some applications, one or more of the class, parameter and instruction bytes are redundant and can be eliminated. However, we need to signal to the tag which fields are present in a received data frame.

One possibility is to utilize the existing BlockWrite and Read commands and specify a wrapper with a bit field to indicate which ISO 7816-4 fields are present. This wrapper provides a security sublayer, allowing the tag to unambiguously reconstruct the original ISO 7816-4 APDU if desired. More specifically, we can prepend all ISO 7816-4 APDUs with a header to indicate which fields are present as shown in TABLE 8.

TABLE 8

Security Sublayer Header

| | Command Class Byte | Command Instruction Byte | Command Parameters |
|---|---|---|---|
| Number of bits | 1 | 1 | 1 |

Then, as shown in TABLE 9, we specify a complete BlockWrite data frame to send an ISO 7816-4 APDU for an entity authentication protocol as above. We compute the 64-bit value $R_T$ given the 64-bit value $C_R$ provided by the reader, and obtain a savings of 29 bits compared with TABLE 7. As noted above, these parameters are provided as an example and many other combinations are possible, including an implied $C_R$ value and a 32-bit password returned as in TABLE 10.

TABLE 9

Using BlockWrite Command with Explicit Challenge Value

| EPC Layer | | | | | Data | | | | | |
|---|---|---|---|---|---|---|---|---|---|---|
| Security Layer | Cmd | Bank | Ptr | Count | Header | Data Len | Data | Resp Len | Handle | CRC |
| Number of bits | 8 | 2 | EBV | 8 | 3 | 8 | 64 | 8 | 16 | 16 |
| Desc | 11000111 | 11 | 0000000 | 00000110 | 000 | 00001000 | $C_R$ | 00001000 | Handle | |

TABLE 10

Using BlockWrite Command with Implicit Challenge Value

| Security Layer | EPC Layer | | | | Data | | | | | |
|---|---|---|---|---|---|---|---|---|---|---|
| | Cmd | Bank | Ptr | Count | Header | Data Len | Data | Resp Len | Handle | CRC |
| Number of bits | 8 | 2 | EBV | 8 | 3 | 0 | 0 | 8 | 16 | 16 |
| Desc | 11000111 | 11 | 0000000 | 00000110 | 000 | | | 00000100 | handle | |

It should be noted that ISO 7816-4 allows the DataLen and Data fields to be omitted entirely if their values are implied, and thus we need not explicitly signal their presence. This result leaves us with a data frame of only 68 bits, 32 of which are the handle and CRC. Response frames are unchanged and remain as above. A summary of over-the-air complexity for the present examples is provided in TABLE 11.

TABLE 11

Frame Sizes for Compressed Internal Authenticate using BlockWrite

| Frame Type | Bytes | Bits |
|---|---|---|
| Compressed BlockWrite Carrying Internal Authenticate with Challenge | 18 | 140 |
| Compressed BlockWrite Carrying Internal Authenticate with Implicit Challenge | 9 | 68 |
| Read Carrying Response | 18 | 137 |

Further reductions are possible with the use of specialized commands, as will now be described. The EPCglobal Class-1 Gen-2 standard defines command identifiers using up to 8 bits each for base commands, and 16 bits each for custom or proprietary commands. We observe that in our use of the BlockWrite and Read commands, bits are devoted to specifying a memory location and data length. A new or custom command's identifier may directly imply the memory location, saving some bits. In addition, the ISO 7816-4 APDU either specifies its own length explicitly in the DataLen field, or, like other parameters, it is previously known by both parties, allowing us to optionally dispense with the Word-Count field. By defining a new command we can save a total of 17 bits by using an unreserved 8-bit identifier, of which there are 22 currently available. Of course, we could define a custom command instead, but then we would only save 9 bits since an additional 8 bits are required to specify a custom command. The command and response versions are illustrated in TABLES 12-15 below.

TABLE 12

New EPC-layer Command for ISO 7816 Command APDU

| | Command | Header | Compressed 7816 APDU | Handle | CRC-16 |
|---|---|---|---|---|---|
| Number of bits | 8 | 3 | Variable | 16 | 16 |
| Description | 11001001 | | $C_R$ | handle | |

TABLE 13

EPC-layer Tag Reply to ISO 7816 Command APDU

| | Header | Handle | CRC-16 |
|---|---|---|---|
| Number of bits | 1 | 16 | 16 |
| Description | 0 | handle | |

TABLE 14

New EPC-layer Command for ISO 7816 Response APDU

| | Command | Handle | CRC-16 |
|---|---|---|---|
| Number of bits | 8 | 16 | 16 |
| Description | 11001010 | handle | |

TABLE 15

EPC-layer Tag Reply for ISO 7816 Response APDU

| | Header | Response Data | Status Bytes | Handle | CRC-16 |
|---|---|---|---|---|---|
| Number of bits | 1 | Variable | 16 | 16 | 16 |
| Description | 0 | $R_T$ | | | |

TABLE 16 compares the size of the data frames in each of these scenarios when used with the example challenge-response authentication protocol.

TABLE 16

Sizes of New or Custom Commands

| Frame Type | Bytes | Bits |
|---|---|---|
| New EPC-layer Command for ISO 7816 APDU Command with Challenge | 15 | 123 |
| New EPC-layer Command for ISO 7816 APDU Command with Implicit Challenge | 6 | 51 |
| Custom EPC-layer Command for ISO 7816 APDU Command with Challenge | 16 | 131 |
| Custom EPC-layer Command for ISO 7816 APDU Command with Implicit Challenge | 8 | 59 |
| EPC-layer Tag Reply to Response APDU | 15 | 113 |

The foregoing examples assume that a tag is fully singulated before the cryptographic protocol takes place. However, with reference to the example security function $RT=H(K_{TS}, C_R)$ described above, it can be seen that if each tag has a unique key $K_{TS}$, then the value $C_R$ need not be unique to each tag. This use of a non-unique challenge value is common practice in the application of one-time passwords for user login, as $C_R$ will often be either the time of day or a counter. Performing entity authentication of a group of tags can be greatly optimized by delivering $C_R$ to all tags and allowing them to respond individually. Toward this end, QuerySecure and ACKSecure commands may be defined that perform these functions using the techniques described above. More specifically, the QuerySecure command extends the existing Query command by appending the Header, DataLen, Data, RespLen, and 7816 APDU fields and replacing the CRC-5 with a CRC-16. The resulting data frame has a length of 101 bits, but in contrast to the commands described previously, only needs to be sent once to a population of tags. The ACKSecure command likewise simply appends the Response Data and Status Bytes fields to the existing ACK command. The responding tag provides its EPC followed by the $R_T$ value it computed.

The techniques disclosed herein permit the creation of RFID tags that are compliant with the Class-1 Gen-2 EPC standard, but offer the broad and widely supported cryptographic functionality of standards like ISO 7816-4. The illustrative embodiments described above optimize one commonly used cryptographic operation for each tag. In the case of tag authentication using a block cipher, the resulting optimized data frames are shorter than many EPCs. The simplicity and ready extensibility of the disclosed techniques should facilitate penetration of EPC into a broader array of security applications.

It is to be appreciated that the invention does not require the use of any particular cryptographic protocol, such as the example challenge-response authentication protocol described above, or the use of any particular standard, such as EPCglobal Class-1 Gen-2 or ISO 7816-4. The illustrative embodiments provide a number of different ways to add cryptographic functionality to the Class-1 Gen-2 standard while maintaining backward compatibility, for example, by using the BlockWrite and Read commands, by defining custom commands, or by defining new commands. These techniques can be adapted in a straightforward manner for use with other protocols and standards.

Another aspect of the invention relates to a tag that takes a particular action in response to a kill command or other password-protected command. More specifically, the kill functionality of an EPC tag may be used as a simple actuator to perform some task in the physical world upon presentation of the 32-bit kill PIN. The EPCglobal standard does not prohibit the tag from taking any last actions before it deactivates itself, or indeed designing the tag as part of a larger circuit that functions only when the tag is killed. This principle could be used to have the tag act as a switch for virtually any circuit, where the switch could be either opened or closed by the kill command. Moreover, this approach is not restricted to only the kill command. For example, a read command, a write command or other password-protected command could be used instead of, or in addition to, the kill command. There are many possible uses of this actuator approach, but a number of examples will now be described to illustrate the concept.

As a first example, consider counterfeit drugs, which are a big concern in pharmaceutical retailing. Beyond potential loss of revenue for drug manufacturers, the health and safety of the general public is at stake. For this reason, the combination of RFID tags and track-and-trace software aims to verify that a particular package traversed a trusted supply chain. To provide a visual marker of this assurance to the consumer, and to deter subsequent resale, retail pill packages could be designed such that they contain tiny bags of ink. These bags would only be ruptured by an actuator as part of a tag's response to a kill command bearing the correct PIN. The point-of-sale terminal, for its part, would obtain the correct PIN from a backend database only if the product's pedigree can be verified.

Another example relates to consumer goods, such as cell phones, that are notoriously prone to theft from retailers and the supply chain. More particularly, one could incorporate into a cell phone an RFID tag that stores the Electronic Serial Number of the cell phone, and makes this vital piece of information available to the rest of the cell phone's electronics only when the tag has been killed using the correct PIN. Similar arrangements could be used with other types of consumer electronics.

It is to be appreciated that the particular configuration, elements and operating parameters of the illustrative embodiments are not requirements of the invention, and should not be construed as limiting the scope of the invention in any way.

For example, the system elements and their configuration as shown in FIGS. 1, 2 and 3 may be varied in alternative embodiments. Similarly, the particular protocol steps in the flow diagram of FIG. 4 can be varied in alternative embodiments. As one more particular example, certain operations described as being performed by a reader in one embodiment can be performed at least in part by a verifier in an alternative embodiment, or may be performed jointly by cooperating reader and verifier elements in still further alternative embodiments. Those skilled in the art can make these and other modifications in the described embodiments in a straightforward manner.

In addition, although described in the context of EPC tags, the techniques of the present invention may be implemented in systems which utilize a wide variety of other types of RFID devices and associated communication protocols.

Furthermore, the various simplifying assumptions made above in the course of describing the illustrative embodiments should also be viewed as exemplary rather than as requirements or limitations of the invention. In alternative embodiments, one or more of these assumptions need not apply.

These and numerous other alternative embodiments within the scope of the appended claims will be readily apparent to those skilled in the art.

What is claimed is:

1. A method for use in an RFID system comprising a plurality of RFID devices and at least one reader which communicates with one or more of the devices, the method comprising the steps of:

transmitting a first command from the reader to write a first data unit to a memory of a given one of the RFID devices;

receiving a reply in the reader from the given RFID device indicating that a second data unit determined based on contents of the first data unit is available in the memory to be accessed by the reader; and transmitting a second command from the reader to the given RFID device to allow the reader to read the memory to thereby obtain the second data unit;

wherein the first and second data units comprise information exchanged as part of a cryptographic protocol carried out between the reader and the given RFID device; and wherein the second command is transmitted to the given RFID device responsive to receipt of the reply from the given RFID device.

2. The method of claim 1 wherein the given RFID device comprises an electronic product code (EPC) tag.

3. The method of claim 2 wherein the EPC tag comprises a Class-1 Gen-2 EPC tag.

4. The method of claim 1 wherein the reply received in the reader indicating that a second data unit is available in the memory to be accessed by the reader comprises a reply of the reader to a successful BlockWrite command as defined in the EPCglobal Class-1 Gen-2 standard.

5. The method of claim 1 wherein the reader reads the memory by receiving a second reply containing the second data unit.

6. The method of claim 1 wherein the first command indicates that the first data unit should be written to a first designated location in the memory of the given one of the RFID devices.

7. The method of claim 6 wherein the second command indicates that the second data unit should be read from a second designated location in the memory of the given RFID device.

8. The method of claim 1 wherein the first and second data units are stored in a common designated location starting with a specified word in a specified bank of a multi-bank memory of the given RFID device.

9. The method of claim 1 wherein the cryptographic protocol carried out between the reader and the given RFID device comprises a challenge-response authentication protocol.

10. The method of claim 9 wherein the first data unit comprises a challenge value of the challenge-response authentication protocol.

11. The method of claim 9 wherein the second data unit comprises a response value of the challenge-response authentication protocol.

12. The method of claim 11 further including the step of authenticating the given RFID device based on the response value.

13. The method of claim 9 wherein an implied challenge value of the challenge-response protocol is determined by the given RFID device based on a current value of at least one of a real-time clock and a counter.

14. The method of claim 13 wherein the first data unit comprises information associated with a request by the reader for a one-time password from the given RFID device and the second data unit comprises a one-time password generated by the given RFID device responsive to the request.

15. The method of claim 1 wherein the first and second data units comprise application protocol data units configured in accordance with an ISO 7816 protocol.

16. The method of claim 1 wherein at least one of the application protocol data units configured in accordance with the ISO 7816 protocol comprises a command transmitted in a compressed format which includes a header indicating presence or absence of one or more of a command class byte, a command instruction byte and a command parameters byte.

17. The method of claim 3 wherein the first and second commands comprise one of the following:
  (i) respective BlockWrite and Read commands of the EPCglobal Class-1 Gen-2 standard;
  (ii) respective new commands defined in a manner compliant with the EPCglobal Class-1 Gen-2 standard but not part of that standard; and
  (iii) respective custom commands defined in a manner compliant with the EPCglobal Class-1 Gen-2 standard but not part of that standard.

18. The method of claim 1 wherein the cryptographic protocol is carried out between the reader and the plurality of RFID devices, with the same first data unit being provided by the reader to each of the plurality of RFID devices, and multiple second data units being obtained individually by the reader from respective ones of the RFID devices.

19. An article of manufacture comprising a computer-readable storage medium storing one or more software programs which when executed by a processor implement the steps of the method of claim 1.

20. An apparatus for use in an RFID system, the apparatus comprising:
  a reader configured to communicate with one or more RFID devices of the system, the reader comprising a processor, a memory coupled to the processor, and interface circuitry coupled to the processor;
  the reader being operative under control of the processor to transmit a first command to write a first data unit to a memory of a given one of the RFID devices, to receive a reply from the given RFID device indicating that a second data unit determined based on contents of the first data unit is available in the memory to be accessed by the reader, and to transmit a second command to the given RFID device to allow the reader to read the memory to thereby obtain the second data unit;
  wherein the first and second data units comprise information exchanged as part of a cryptographic protocol carried out between the reader and the given RFID device; and
  wherein the second command is transmitted to the given RFID device responsive to receipt of the reply from the given RFID device.

21. A method for use in an RFID system comprising a plurality of RFID devices and at least one reader which communicates with one or more of the devices, the method comprising the steps of:
  transmitting a first command from the reader to a given one of the RFID devices;
  receiving a reply in the reader from the given RFID device indicating that a data unit is available in the memory to be accessed by the reader; and
  transmitting a second command from the reader to the given RFID device to allow the reader to read the memory to thereby obtain the data unit;
  wherein the data unit comprises a response value of a challenge-response protocol carried out between the reader and the given RFID device; and
  wherein the second command is transmitted to the given RFID device responsive to receipt of the reply from the given RFID device.

22. The method of claim 21 wherein a challenge value of the challenge-response protocol comprises an implied challenge value determined by the given RFID device.

23. A method for use in an RFID system comprising a plurality of RFID devices and at least one reader which communicates with one or more of the devices, the method comprising the steps of:
  receiving a first command from the reader in a given one of the RFID devices, the first command being a command specified by an RFID standard; and
  prior to execution of the first command, the given RFID device performing responsive to receipt of the first command a non-standard action not specified by the first command or any other command of the RFID standard;
  wherein the first command comprises a kill command.

24. The method of claim 23 wherein the given RFID device comprises an EPC tag.

25. The method of claim 23 wherein the non-standard action comprises actuating a switch associated with the given RFID device.

26. The method of claim 23 wherein the non-standard action comprises actuating a visual marker associated with the given RFID device.

27. The method of claim 23 wherein the non-standard action comprises releasing information from circuitry associated with the given RFID device.

28. A method for use in an RFID system comprising a plurality of RFID devices and at least one reader which communicates with one or more of the devices, the method comprising the steps of:
- receiving in a given one of the RFID devices a first command from the reader directing that a first data unit be written to a memory of the given RFID device;
- transmitting a reply to the reader from the given RFID device indicating that a second data unit determined based on contents of the first data unit is available in the memory to be accessed by the reader; and
- receiving a second command in the given RFID device from the reader to allow the reader to read the memory to thereby obtain the second data unit;
- wherein the first and second data units comprise information exchanged as part of a cryptographic protocol carried out between the reader and the given RFID device;
- wherein the reply is transmitted from the given RFID device responsive to receipt of the first command in the given RFID device.

29. An article of manufacture comprising a computer-readable storage medium storing one or more software programs which when executed by a processor implement the steps of the method of claim 28.

30. An apparatus for use in an RFID system comprising a plurality of RFID devices and at least one reader which communicates with one or more of the devices, the apparatus comprising:
- a given one of the RFID devices, the given RFID device comprising a processor, a memory coupled to the processor, and interface circuitry coupled to the processor;
- the given RFID device being operative under control of the processor to receive a first command from the reader directing that a first data unit be written to a memory of the given RFID device, to transmit a reply to the reader indicating that a second data unit determined based on contents of the first data unit is available in the memory to be accessed by the reader, and to receive a second command from the reader to allow the reader to read the memory to thereby obtain the second data unit;
- wherein the first and second data units comprise information exchanged as part of a cryptographic protocol carried out between the reader and the given RFID device;
- wherein the reply is transmitted from the given RFID device responsive to receipt of the first command in the given RFID device.

31. The method of claim 1 wherein the first command indicates that the first data unit should be written to a designated location in the memory of the given one of the RFID devices and wherein the second command indicates that the second data unit should be read from the designated location in the memory of the given RFID device.

* * * * *